Nov. 25, 1941.  T. W. THIRLWELL  2,264,225
DIRECTION SIGNAL SWITCH
Filed March 14, 1941    2 Sheets-Sheet 1

Thomas W. Thirlwell.
INVENTOR
BY Victor J. Evans & Co.

Nov. 25, 1941.  T. W. THIRLWELL  2,264,225
DIRECTION SIGNAL SWITCH
Filed March 14, 1941  2 Sheets-Sheet 2
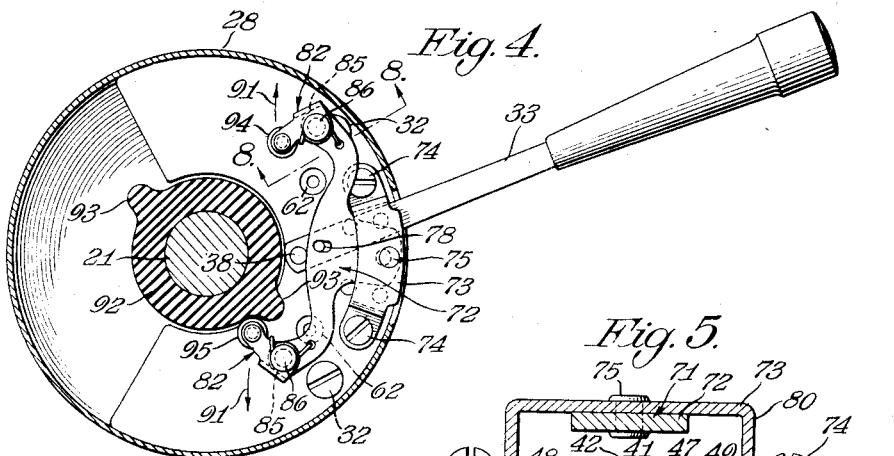
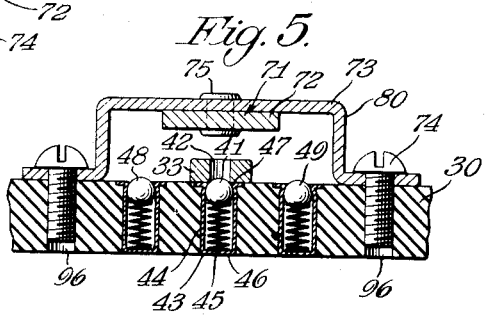
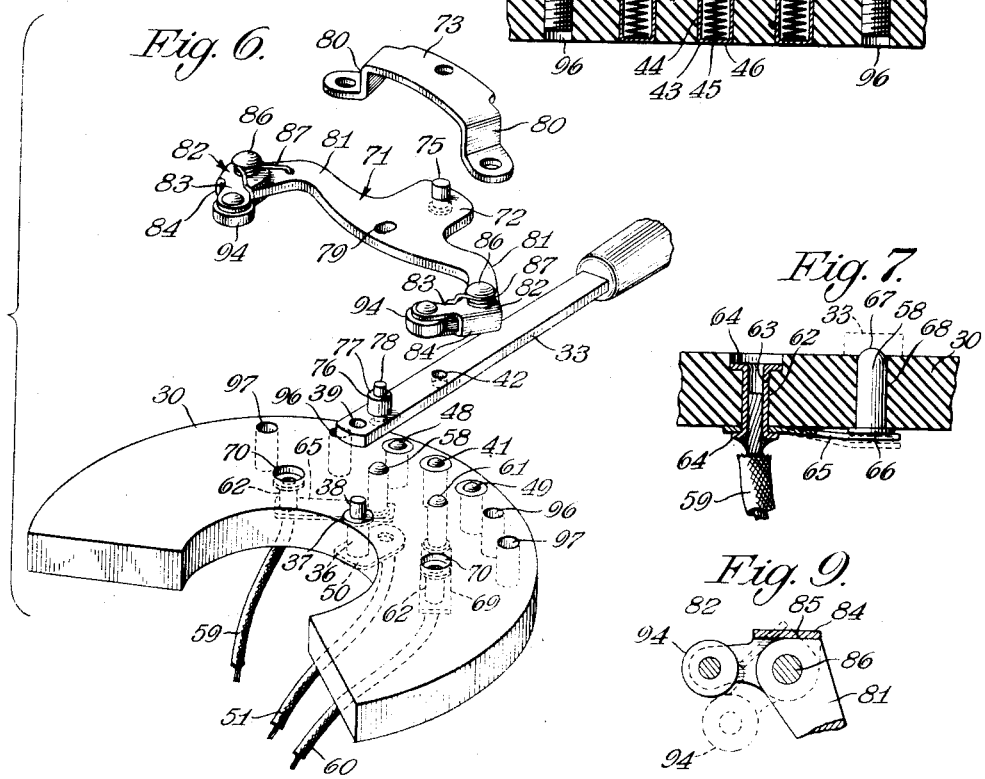
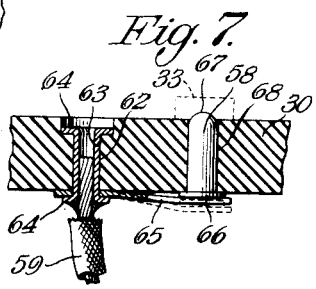
Thomas W. Thirlwell.
INVENTOR
BY Victor J. Evans & Co.
ATTORNEYS Patented Nov. 25, 1941

2,264,225

UNITED STATES PATENT OFFICE 2,264,225

DIRECTION SIGNAL SWITCH

Thomas W. Thirlwell, Mount Vernon, Ohio

Application March 14, 1941, Serial No. 383,429

4 Claims. (Cl. 200—59)

My invention relates to signalling devices for automotive vehicles, and has among its objects and advantages the provision of an improved direction signal switch.

An object of my invention is to provide a direction signal switch which is manually controlled for the purpose of selectively closing the circuits of the right and left signal lamps, in which the switch is semi-automatic in that the switch lever is automatically returned to its neutral position as an incident to turning of the steering wheel when bringing the vehicle into the straightaway, and in which the switch embodies a relatively simple and efficient structure so designed as to be readily incorporated in the steering post and wheel structure of present day vehicles.

In the accompanying drawings:

Figure 4 is a view illustrating the switch in one of its signalling positions;

Figure 5 is a sectional view along the line 5—5 of Figure 2;

Figure 6 is a perspective view illustrating the switch parts separated one from the other for the purpose of illustration;

Figure 7 is an enlarged sectional view taken along the line 7—7 of Figure 3;

Figure 8 is a sectional view along the line 8—8 of Figure 4;

Figure 9 is a sectional view taken along the line 9—9 of Figure 8; and

Figure 1:
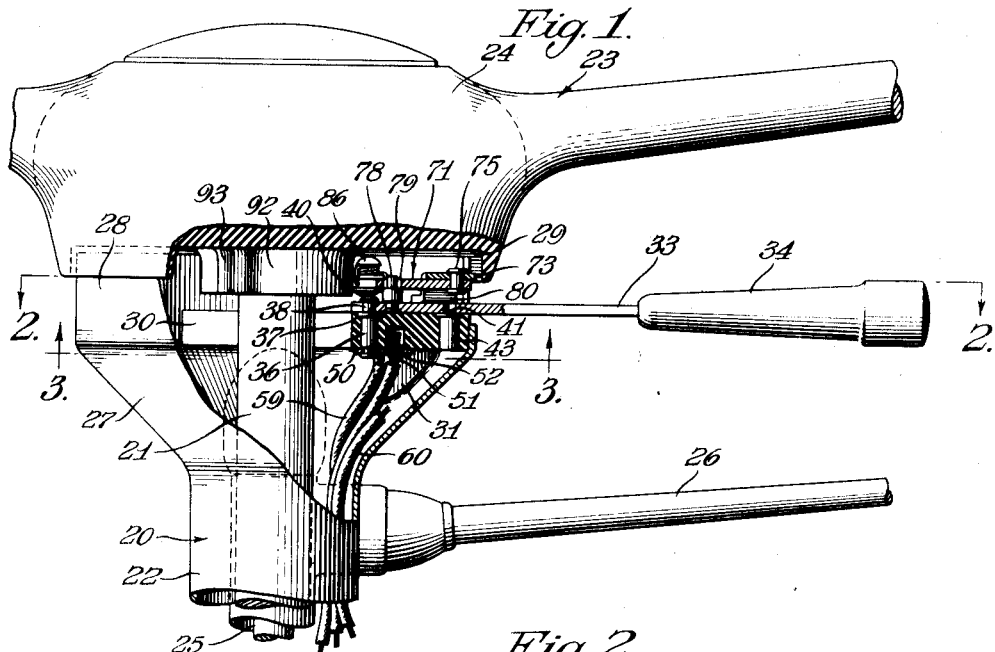
Figure 1 is a fragmentary view of a steering column and its steering wheel illustrating my invention applied thereto.

In the embodiment selected to illustrate my invention, Fig. 1 illustrates a conventional steering column 20 wherein the steering rod 21 is housed inside the relatively fixed tube 22 and rotated through the medium of the steering wheel 23 having its hub 24 fixedly connected with the rod. Associated with the steering column 22 is a gearshift rod 25 of tubular formation and operatively connected with the gearshift lever 26 located in close proximity to the steering wheel 23. The structure so far described is old and well known in the art and need not be explained in further detail.

Tube 22 is flared at 27 and the flare terminates in a flange 28 which extends partly inside the recess 29 in the hub 24. To the flange 28 is secured a mount 30 of insulating material, which mount is in the nature of a segmental washer having its outer peripheral face fitting snugly against the inner face of the flange 28 and its inner peripheral face characterized by a radius of considerably greater extent than the radius of the steering rod 21, so that the mount is clear of the steering rod. The mount is also located slightly beneath the hub 24 so as to be clear of both the rod and the hub. Two lugs 31 extend inwardly from the inner face of the flange 28 and engage the bottom face of the mount 30 with the mount provided with openings for the reception of screws 32 threaded into the lugs 31 for fixedly securing the mount.

To the mount 30 is pivotally connected a switch lever 33 having a grip 34 located between the gearshift lever 26 and the steering wheel 23 when viewed according to Fig. 1. Lever 33 is arranged at right angles to the steering rod 21 and lies against the upper face of the mount 30, the flange 28 being cut away at 35 to provide accommodation for the lever. In Figs. 1 and 6, a pin 36 extends through the mount 30 and has a flange 37 lying flush with the upper face of the mount, and the end 38 of the pin extends through an opening 39 in the end of the lever 33, see Fig. 6. Fig. 1 illustrates the pin 38 as being riveted at 40 which connects the lever with the pin but permits relative pivotal movement of the lever about the pin as an axis.

Figure 2:
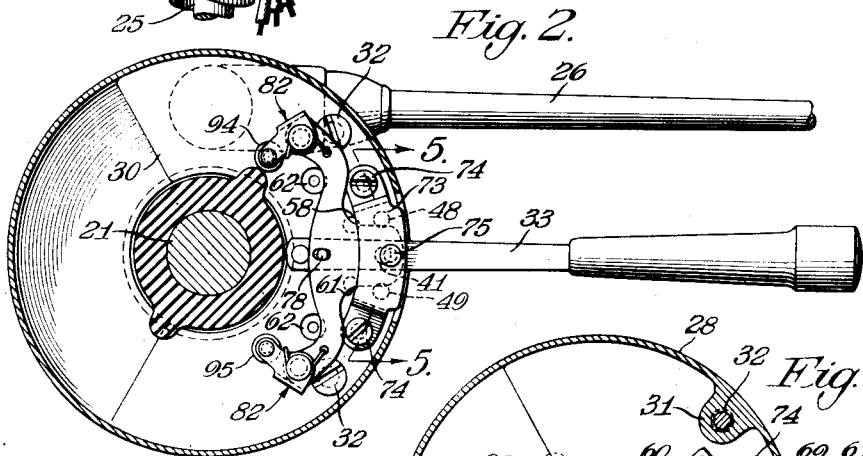
Figure 2 is a sectional view taken along the line 2—2 of Figure 1.

Fig. 2 illustrates the lever 33 in its neutral position, at which time the lever is yieldingly latched against pivotal movement by a latch ball 41, see Fig. 5, which is partially receivable in the bore 42 in the lever 33. A tube 43 is pressed into a bore 44 in the mount 30 and a compression spring 45 is interposed between the ball 41 and the bottom 46 of the tube for yieldingly pressing the ball into latching engagement with the lever 33. The tube 43 is slightly constricted at 47 to hold the ball assembled with the tube 43.

Movement of the lever 33 in a counter-clockwise direction when viewing Fig. 2 a predetermined distance for closing the signal indicating a left turn brings the lever into latched engagement with a spring-pressed ball 48, see Fig. 5, identical with the ball 41 and its mounting. Similarly, pivotal movement of the lever 33 of Fig. 2 in a clockwise direction a predetermined distance to close the circuit through the right turn indicating lamp brings the lever into latched engagement with a spring-pressed ball 49, see Fig. 5, identical with the ball 41 and its mounting.

Figure 3:
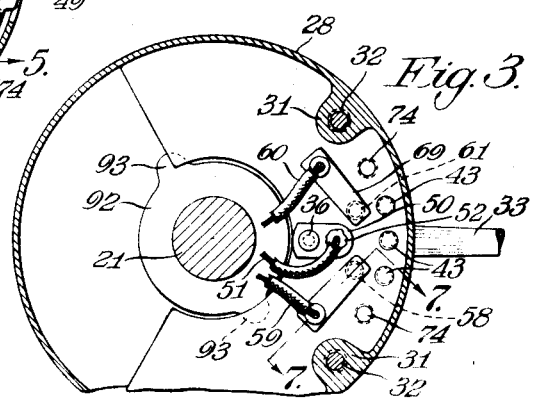
Figure 3 is a sectional view along the line 3—3 of Figure 1.

To the lower end of the pin 36, see Figs. 1, 3 and 6, is riveted a conductor strip 50 provided with a perforation for the reception of one end of a circuit wire 51 made secure by solder 52, see Fig. 1. Wire 51 is connected with a source of current such as the battery 53 of Fig. 10. Thus the lever 33 is electrically connected with the battery 53.

Figure 10:
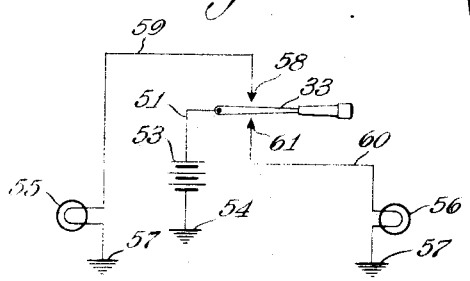
Figure 10 is a diagrammatic view illustrating the action of the signal switch in conjunction with the electric circuit controlled thereby.

Battery 53 of Fig. 10 is grounded at 54 and the left turn and right turn lamps 55 and 56, respectively, are grounded at 57. Lamp 55 is electrically connected with a terminal 58 through the medium of a wire 59, and the terminal 58 is engageable by the lever 33 when pivoted in a counter-clockwise direction for closing the circuit through the lamp 55. A wire 60 electrically connects the lamp 56 with a terminal 61 engageable by the lever 33 when pivoted in a clockwise direction for closing the circuit through the lamp 56.

Referring to Figs. 3 and 7, the wire 59 is secured to a sleeve 62 secured in an opening 63 in the mount 30. The sleeve has its ends expanded to provide flanges 64 to hold the sleeve in place. Between one of the flanges and the bottom face of the mount 30 is secured a resilient conductor strip 65 which bears against the head 66 of the terminal 58. Fig. 7 illustrates the normal position of the terminal, at which time its rounded end 67 projects slightly above the upper face of the mount 30. Head 66 engages the bottom face of the mount to prevent the terminal from being pushed upwardly beyond the position illustrated, but the terminal is slidably guided in a bore 68 in the mount 30 so that the terminal may be depressed to the dotted line position of Fig. 7 when the lever 33 is moved to its position for closing the circuit through the left turn lamp 55. The rounded end 67 acts on the lever 33 to cam the terminal 58 downwardly flush with the upper face of the mount 30. With the lever 33 engaging the terminal 58, the latch ball 49 yieldingly holds the lever 33 in its circuit closing position so as to restrain the lever from accidental displacement.

Wire 60 is also connected with a resilient conductor strip 69, see Figs. 3 and 6, which is identical with the conductor strip 65 and acts on the terminal 61 for resiliently holding it in the path of the lever 33. The flanges 64 at the upper ends of the sleeve 62 lie in recesses 70 so as to lie clear of the lever 33 to the end that the latter might pivot in slidable engagement with the mount 30.

While the lever 33 is manually actuated for signal circuit closing purposes, a lever return is provided for pivoting the lever to its neutral position as an incident to turning of the steering wheel as the vehicle is brought into the straightaway through reverse rotation of the steering wheel. The lever return comprises a T-shaped member 71, the ear 72 of which is pivotally connected with a bracket 73 fixedly secured to the mount 30 by screws 74. The pivotal connection between the T-shaped member 71 and the bracket 73 comprises a rivet 75, best illustrated in Fig. 1. To the lever 33 and between the openings 39 and 42, see Fig. 6, is riveted a post 76 having its end 77 engaging the bottom face of the T-member 71, the latter paralleling the lever 33 when viewed according to Fig. 1. While the T-member may be pivoted about the axis of the rivet 75, the member is held against the bracket 73 and also rests on the end 77 of the post 76 so as to be restrained from oscillation in a vertical plane.

The upper end of the post 76 is reduced in diameter to provide a pin 78 extending into a slot 79 in the T-member 71. Fig. 2 illustrates the normal position of the T-member 71 in the neutral position of the lever 33 and Fig. 4 illustrates the position of the T-member when the lever 33 is pivoted to its circuit closing position with respect to the left turn light 55. Movement of the lever 33 to either of its extreme positions brings the lever into engagement with one of the walls 80, which stops further pivotal movement of the lever. Thus the latch balls 48 and 49 yieldingly latch the lever 33 in its respective signalling positions while the walls 80 act as stops to prevent the lever from being pivoted to positions beyond latching relationship with the respective latch balls. Thus the operator may pivot the lever 33 in either direction as far as it will go and the latch balls then are brought into play to yieldingly latch the lever in its respective positions. This feature makes for certainty in that the operator need not determine the circuit closing positions of the lever 33 by the sense of touch alone, as by moving the lever to a position where it is yieldingly latched against further pivotal movement.

To the ends of the arms 81 of the T-member 71 are mounted detents 82. The detents are formed of sheet metal bent to provide flanges 83 spaced to receive the arms 81 therebetween, which flanges are interconnected by bights 84 which normally engage the flat ends 85 of the arms 81, as illustrated in Fig. 9 which illustrates a portion of one of the detents. Both detents are identical in construction and operation so that the description of one will apply to both. Each detent is pivotally connected with its respective arm 81 by a pin 86. A spring 87 is convoluted upon each pin 86, see Fig. 8, and one end of the spring has a hook 88 connected with one of the flanges 83 and its other end bent to provide a pin 89 inserted in an opening 90 in its respective arm 81. The springs 87 pivot the detents 82 in the direction of the arrows 91 and yieldingly hold the detents in abutting engagement with the flat ends 85 on the arms 81. Both detents are thus restrained from pivotal movement in the direction of the arrows 91 beyond the positions where their respective bights 84 engage the flat ends 85.

Depending from the hub 24 and located in the recess 29 thereof is a boss 92 of insulating material and concentrically arranged on the steering rod 21 and provided with two lugs 93 spaced 180° apart for coaction with the detents 82 for returning the lever 33 to its neutral position after a turn has been completed in either direction. One detent 82 is provided with a roller 94 which takes a position in the path of the lugs 93 when the lever 33 is shifted for illuminating the right turn lamp 56, while the other detent 82 is provided with a roller 95 which takes a position in the path of the lugs when the lever is pivoted for energizing the left turn signal lamp. Fig. 4 illustrates the left turn signalling position of the lever 33 and Fig. 2 illustrates the normal positions of the rollers 94 and 95 which permits rotation of the lugs 93 with the steering wheel without interfering engagement with either of the rollers 94 or 95.

Referring to Fig. 4, with the lever 33 pivoted to the position illustrated for the purpose of indicating an intended left turn, the T-member 71 is pivoted in a clockwise direction about the rivet 75 as an axis which swings the roller 95 into the path of the lugs 93. As the steering wheel is rotated in a counter-clockwise direction for left turn purposes, one or both lugs 93 may be brought into engagement with the roller 95. In view of the fact that the detent which carries the roller 95 may pivot reversely of the arrow 91, the detent yields when engaged by a lug 93 to permit continued rotation of the steering wheel. As the vehicle is being brought into the straightaway, reverse rotation of the steering wheel brings a lug 93 into engagement with the roller 95, but travelling in a clockwise direction, so that the T-member 71 is pivoted in a counter-clockwise direction to its normal position of Fig. 2. Such counter-clockwise rotation of the T-member pivots the lever 33 to its normal position by reason of the pin 78 which extends into the slot 79 in the T-member. The detent 82 which carries the roller 94 operates identically with the detent carrying the roller 95 with the exception that it is reversed with respect to pivotal freedom so as to act on the T-member 71 for returning the lever 33 to its normal position upon completion of a right turn.

Threaded openings 96 are provided in the mount 30, see Fig. 6, for the reception of the bolts 74 of Fig. 5. Openings 97 are also provided in the mount for the screws 32 which are threaded into the lugs 31.

Without further elaboration, the foregoing will so fully illustrate my invention that others may, by applying current knowledge, readily adapt the same for use under various conditions of service.

I claim:

1. A direction signal switch for automotive vehicles having a steering column, a steering shaft and left and right turn signal circuits, comprising an insulated mount fixedly secured to said column; left turn and right turn terminals carried by said mount and each electrically connected with one wire of the left and right turn circuits, respectively; a manually actuated switch lever pivoted on said mount and comprising a conductor electrically connected with a common wire of said left and right turn circuits and selectively movable into engagement with said left and right turn terminals for closing the respective left and right turn signal circuits; a bracket fixed to said mount; and means pivotally connected with said bracket and said lever and actuated through rotation of the steering shaft for moving said lever to its neutral position from either of its left or right turn terminal engaging positions as the vehicle is being brought into the straightaway.

2. A direction signal switch for automotive vehicles having a steering column, a steering shaft and left and right turn signal circuits, comprising a mount fixedly secured to said column; left turn and right turn terminals carried by said mount and each electrically connected with one wire of the left and right turn circuits, respectively; a manually actuated switch lever pivoted on said mount and comprising a conductor electrically connected with a common wire of said left and right turn circuits and selectively movable into engagement with said left and right turn terminals for closing the respective left and right turn signal circuits; a bracket secured to said mount; a member pivotally connected with said bracket and having a pivotal connection with said lever between the pivotal connection of the lever with said mount and the pivotal connection between said member and said bracket; detents yieldingly mounted on said member; and lug means rotatable with said steering shaft and acting on said detents to move said lever to a neutral position or from either of its left or right turn terminal engaging positions as the steering shaft is rotated to bring the vehicle into the straightaway.

3. A direction signal switch for automotive vehicles having a steering column, a steering shaft and left and right turn signal circuits, comprising a mount fixedly secured to said column; left turn and right turn terminals carried by said mount and each electrically connected with one wire of the left and right turn circuits, respectively; a manually actuated switch lever pivoted on said mount and comprising a conductor electrically connected with a common wire of said left and right turn circuits and selectively movable into engagement with said left and right turn terminals for closing the respective left and right turn signal circuits; a bracket secured to said mount; a member pivotally connected with said bracket and having a pivotal connection with said lever between the pivotal connection of the lever with said mount and the pivotal connection between said member and said bracket; detents yieldingly mounted on said member; and lug means rotatable with said steering shaft and acting on said detents to move said lever to a neutral position or from either of its left or right turn terminal engaging positions as the steering shaft is rotated to bring the vehicle into the straightaway; said detents being clear of said lug in the neutral position of said lever and respectively yielding when engaged thereby in the respective left and right turn terminal engaging positions of the lever, while the vehicle is being moved into the turn, but nonyielding as the vehicle is being brought into the straightaway.

4. A direction signal switch for automotive vehicles having a steering column, a steering shaft and left and right turn signal circuits, comprising an insulated mount fixedly secured to said column; left turn and right turn terminals carried by said mount and each electrically connected with one wire of the left and right turn circuits, respectively; a manually actuated switch lever pivoted on said mount and comprising a conductor electrically connected with a common wire of said left and right turn circuits and selectively movable into engagement with said left and right turn terminals for closing the respective left and right turn signal circuits; and means pivotally mounted on said mount and pivotally connected with said lever and operatively connected with the steering shaft for moving the lever to its neutral position from its respective left and right turn terminal engaging positions as the vehicle is being brought into the straightaway.

THOMAS W. THIRLWELL.